United States Patent

[11] 3,629,821

[72] Inventor Hugh L. Dobbins
   827 Concord Road, Smyrna, Ga. 30080
[21] Appl. No. 862,437
[22] Filed Sept. 30, 1969
[45] Patented Dec. 21, 1971

[54] VISUAL DISTRESS SIGNALING SYSTEM
   5 Claims, 3 Drawing Figs.
[52] U.S. Cl. .................................................. 340/81, 340/324
[51] Int. Cl. ..................................................... B60q 1/52
[50] Field of Search ............................................ 340/52, 66, 74, 79–83, 110–112

[56] References Cited
   UNITED STATES PATENTS

| | | | |
|---|---|---|---|
| 1,106,432 | 8/1914 | Wilcox | 340/52 UX |
| 1,311,662 | 7/1919 | McKeever | 340/74 |
| 1,517,011 | 11/1924 | Lunday | 340/74 UX |
| 2,078,372 | 4/1937 | Davis | 340/81 UX |
| 2,321,803 | 6/1943 | Falge et al. | 340/55 X |
| 2,500,201 | 3/1950 | Porter | 340/74 UX |
| 2,695,343 | 11/1954 | Howard | 340/74 X |
| 2,845,608 | 7/1958 | Short | 340/81 |
| 3,005,975 | 10/1961 | Lea | 340/81 |

FOREIGN PATENTS

| | | | |
|---|---|---|---|
| 347,762 | 5/1931 | Great Britain | 340/74 |
| 824,887 | 12/1959 | Great Britain | 340/81 |

Primary Examiner—John W. Caldwell
Assistant Examiner—Kenneth N. Leimer
Attorney—Cushman, Darby & Cushman ABSTRACT: A visual distress signaling system designed especially for use in conjunction with automotive vehicles and including two lamps of different colors viewable from the front of the vehicle, and two lamps of different colors viewable from the back of the vehicle. A manually operable control unit capable of operating the front and rear lights independently, and particularly for flashing the front or rear lights alternately as a primary distress signal and simultaneously flashing only one of the lights (preferably the blue light) at the opposite end of the vehicle indicating to passers-by going in the other direction to disregard for flashing only one of the front and rear lights as an acknowledgement of another primary distress signal, and for flashing only the other lamp of the front and rear lights as a secondary distress signal for guiding a rescue vehicle or indicating that assistance has been provided.

PATENTED DEC 21 1971

INVENTOR

HUGH L. DOBBINS

BY Cushman, Darby & Cushman

ATTORNEYS

INVENTOR
HUGH L. DOBBINS
BY Cushman, Darby & Cushman
ATTORNEYS

VISUAL DISTRESS SIGNALING SYSTEM

BRIEF DESCRIPTION OF THE PRIOR ART AND SUMMARY OF THE INVENTION

The invention relates to communication systems and particularly to signaling systems for producing visual emergency and recognition signals in vehicles.

As the number of limited-access superhighways increases and the number of cars crowding them increases at an even greater rate, the dangers and difficulties resulting from a vehicle breakdown have also become substantial and alarming. Because breakdowns usually do not occur at convenient locations near service stations or other areas where help may be sought, the choices available to the motorist in trouble are to attempt to flag a passing car or to walk many miles to the nearest filling station or service center. Walking along a superhighway today is a dangerous undertaking, which may well be illegal, as well. Further, since most such highways have limited access, there may be no way to safely reach a service station on foot, even if one is nearby. Attempting to flag a passing car is likewise rather a futile effort, because of the reluctance of the public to respond to what could conceivably be a criminal trap and because of the long distance required to stop at high speeds.

Even just leaving the vehicle to attempt to flag a passing car may be dangerous. However, without a signaling system which can be activated from the interior of the vehicle, there is no way to signal distress except by exiting and raising the hood, tying a white handkerchief to the radio antenna or trying to wave at passing cars. None of these distress signals is particularly effective, nor does either a passing motorist or the motorist in the stranded vehicle know whether or not aid has already been summoned.

Most potential systems which could be employed on pleasure vehicles to signal distress are too complex and expensive to be practical, or are otherwise unsuited for general use. The present invention relates to a simple signaling system whereby at least two different colored lights are mounted on the vehicle so as to be viewable from the front and two similar lights are mounted so as to be viewable from the rear. These lights are independently operable in at least three modes for producing three different signals.

A system similar to the one described in detail below is fully disclosed and described in U.S. Pat. application Ser. No. 528,157, filed Feb. 17, 1966, now U. S. Pat. No. 3,493,924, and the disclosure of that application is explicitly incorporated herein by reference. The above-mentioned application describes a visual distress signaling system with signal lights mounted either within the car or exterior to it, such as adjacent the taillights and the headlights, the lights being controlled by a manually operated, electrical circuit which causes them to flash in one of three modes. In the first mode, the electrical circuitry, which contains conventional flasher units and connects to a convenient source of electrical potential such as the car battery, flashes the two colored lights, which are preferably blue and green lights, alternately. This mode indicates to passing cars that the operator of the vehicle with the two flashing lights is in distress, and requests passing motorists to stop at the next opportunity and summon aid for the disabled vehicle. The second mode in which the two lights can be operated is with only one of the lights flashing, for example, the green light, while the other light, the blue light, remains dark. This mode can be used by a passing motorist to acknowledge the distress signal and indicate to the motorist in the disabled vehicle with the flashing lights that help will be sent. The third mode in which the flashing lights can be operated is with only the other light, for example, the blue light, flashing, and this mode can be used by the stranded motorist to acknowledge the flashing green light of the passing motorist, to indicate thereafter that there is now no necessity for other cars to summon aid and to point out the disabled vehicle to the tow truck or other vehicle sent to render aid.

However, when two sets of lights are used, one set consisting of a blue and green light which can be seen only from the front of the vehicle and one set consisting also of a blue and green light which can be seen only from the rear of the vehicle, there will be many situations in which it will be desired to operate the sets independently. For any of a variety of reasons, a stranded motorist may wish to summon help only from vehicles going in one direction. One such reason might be that vehicles going in the opposite direction would not encounter a convenient place to summon aid for many miles. A vehicle acknowledging a distress signal may signal that acknowledgment with his front and rear green lights. Stranded motorists likewise may respond to the acknowledgment signal of a passing motorist with the front and rear blue lights.

The present invention relates to an improvement in the distress system described in the above-mentioned application Ser. No. 528,157, whereby the front and rear lights can be operated independently. Further, the arrangement as described below comprises a unique pushbutton arrangement with two flashers which are cross-connected to buttons for operating the two sets of lights.

Many other objects and purposes of the invention will become clear from the following detailed description of the drawings.

DETAILED DESCRIPTION OF THE DRAWINGS

Figure 1:
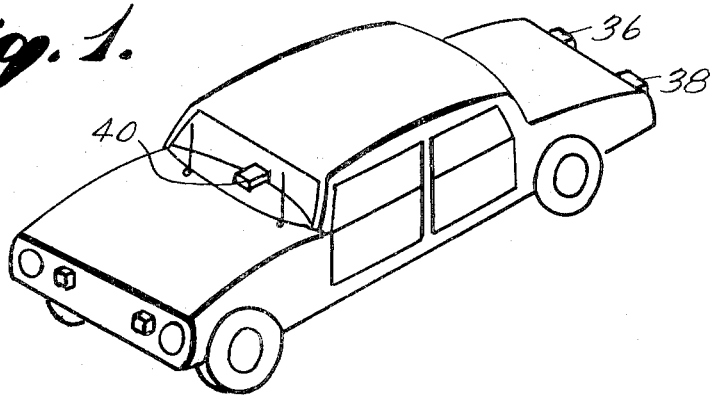
FIG. 1 shows a typical vehicle with front and rear lamps for producing distress signals.

Reference is now made to FIG. 1 which shows a typical and conventional automotive vehicle having both a pair of distress signal lights mounted in the front and a pair in the rear of the vehicle. As described in greater detail, in the above-mentioned application Ser. No. 528,157, the front distress lamps 30 and 32 are provided with tinted glass or are otherwise constructed so as to give off a green and blue light, respectively, and the rear signal lights 36 and 38 are likewise treated so as to produce green and blue illumination, respectively. A control unit 40 is mounted within the vehicle, for example, on the dash as shown, to control the operation of the front distress lights 30 and 32, as well as the rear distress lights 36 and 38, in the three possible modes described briefly above.

As pointed out briefly above, and in greater detail in the aforementioned application Ser. No. 528,157, those three modes in which the green and blue lights can operate are:

1. both green and blue lights flash alternately, producing a distress signal and thus requesting passing motorists to summon help,
2. the green light flashes front and rear as an acknowledgment by a passing motorist of the flashing blue and green distress signal of the disabled motorist, and an indication to the disabled motorist that the signaling passing motorist will summon help; and
3. the blue light flashes front and rear as an acknowledgment to the passing motorist's flashing green lights and an indication that no other motorists need summon aid.

Of course, operation in other modes is possible, but these three modes are preferred.

Figure 3:
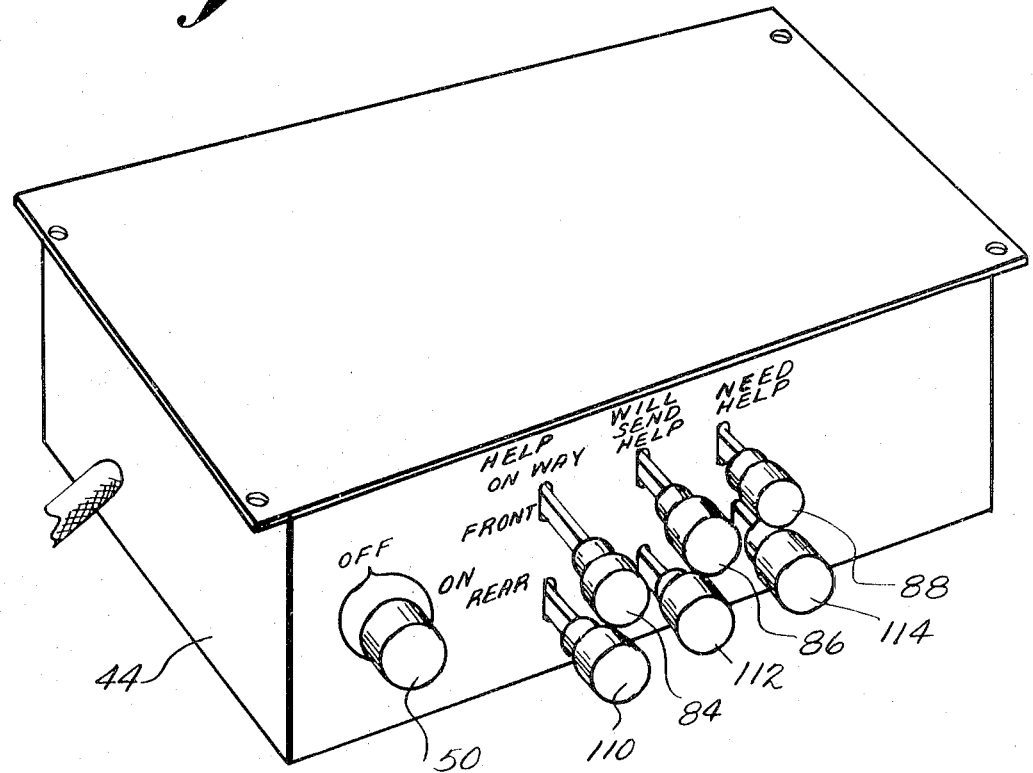
FIG. 3 shows an assembled unit.
Figure 2:
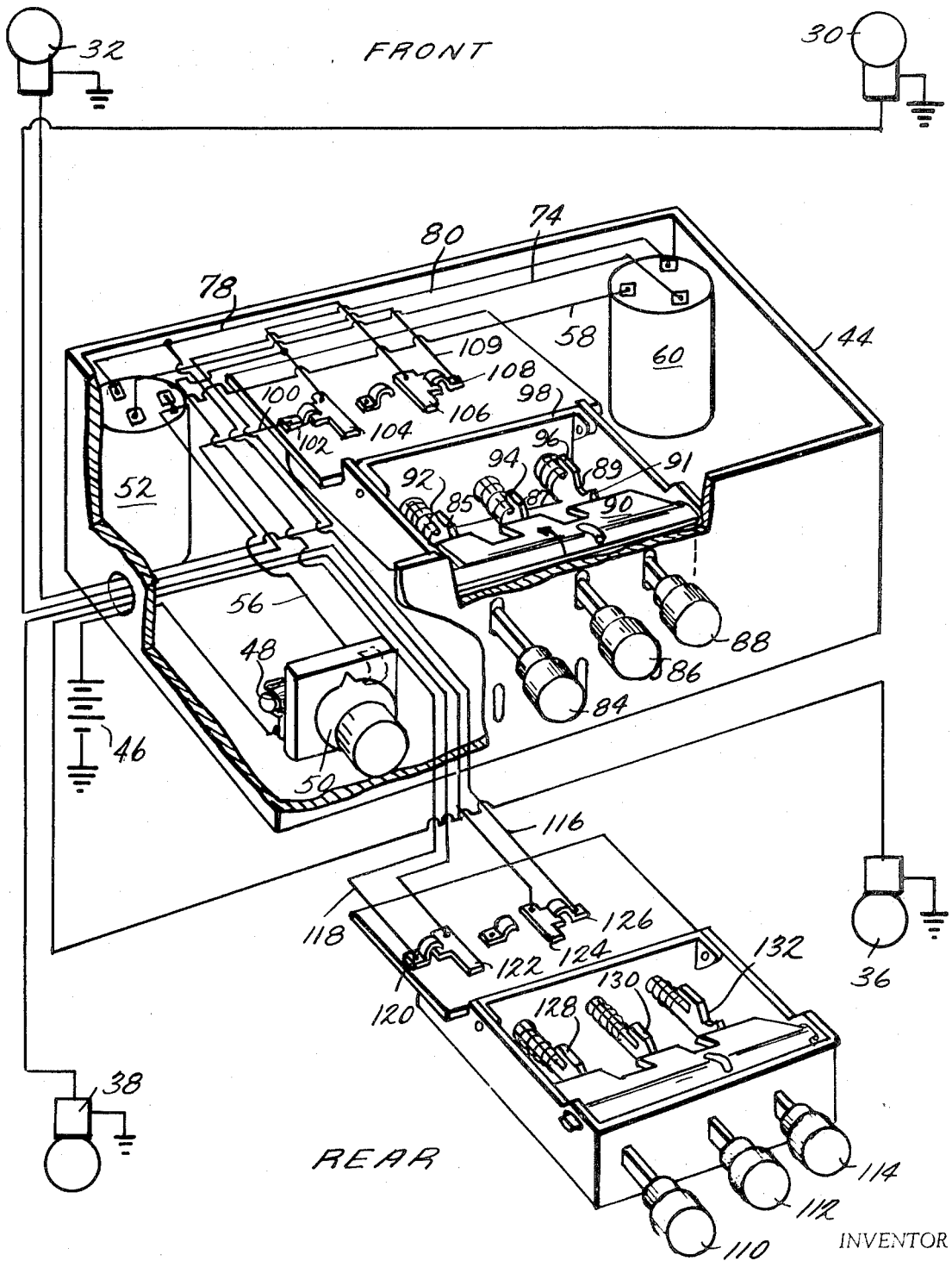
FIG. 2 shows a cutaway view of a pushbutton unit for controlling the front and rear signal lights.

Reference is now made to FIGS. 2 and 3 which show the control unit of this invention for independently operating the two sets of front and rear lights. This control unit is disposed within a cabinet 44 which may be designed so as to blend properly with the styling of the interior of the vehicle. Power for operating the front and rear mounted lamps 30, 32, 36 and 38, which flash the three indicated modes, is normally supplied by a battery 46 which is preferably the storage battery for the vehicle. The load on the battery of the four flashing lights and the control unit will not be normally sufficient to substantially discharge the battery 46 during the time the vehicle is stranded.

A fuse 48 preferably connects battery 46 to the on/off switch 50, which in the "off" position interrupts the passage of current to the flasher 52 and which connects flashers 52 and 60 to the battery 46 when manually shifted to the "on" position. If desired, a separate on/off switch may be provided for the rear and front sets of lights but, in the embodiment shown in FIGS. 2 and 3, only one on/off switch is provided to turn on and off both the rear and front lights. With only one on/off switch, the embodiment of FIGS. 1–3 requires that both the front and rear lights operate in at least one mode, but not necessarily the same one.

Thus, when the switch 50 is shifted to the "on" position, current flows from battery 46 through lines 56 and 58 to flashers 52 and 60. In the arrangement shown in FIGS. 2 and 3, flasher 52 is designed to control the operation of front light 32, which is preferably a blue light and rear light 38 which is also a blue light. A ground line 74 also connects together the two flashers 52 and 60. Flashers 52 and 60 are conventional and one suitable flasher is described in U.S. Pat. No. 2,761,931, the disclosure of which is explicitly incorporated herein by reference. Further, when battery 46 is connected to it by switch 50, flasher 52 produces a pulsing output voltage on line 78 and flasher 60 produces a similar pulsing output voltage on line 80, so that, when line 78 is connected to light 32, a flashing blue light at the front of the vehicle is produced and similarly, when flasher 52 is connected to light 38, a flashing blue light is produced at the rear of the vehicle. Similarly, when flasher 60 is electrically connected via line 80 to lamp 30, a flashing green light is produced at the front of the vehicle and, when it is connected to lamp 36, likewise a flashing green light is produced at the rear of the vehicle.

Three pushbuttons 84, 86, and 88 are provided for controlling the operation of the front lamps 30 and 32 in any one of the three possible signal modes, and three pushbuttons 110, 112, and 114 are similarly provided for independent operation of the rear lamps 36 and 38. These pushbuttons are, in the embodiment shown in FIGS. 2 and 3, mounted conveniently above each other so that they can be easily operated quickly and efficiently by the driver of the vehicle. Further, the three pushbuttons, for example, buttons 84, 86, and 88, which control the operation of the front lamps 30 and 32, are designed so that when one is pushed inward any of the others which are held depressed will be released and will move outward. Thus, normally only one button at a time is kept depressed. This function is performed by a small, conventional latch 90 which, when a button is depressed, is pushed upward by one or more protuberances, such as protuberance 91, on the shaft connected to the depressed button. Springs 92, 94, and 96 are also provided on each shaft of the buttons to push against plate 98 and urge the shafts 85, 87, and 89 and the associated pushbuttons 84, 86, and 88 outward so that when the latch 90 is pushed upward against a spring connecting it to the front of the cabinet 44 by the inward movement of one of the shafts and pushbuttons, latch 90 no longer can maintain either of the other two pushbuttons in a depressed position, so, if either has been held depressed by latch 90 it now moves outward to the outer position.

Pushbutton 84 when in the outer, undepressed position electrically connects, via contacts 102 and 104, line 80 to line 100 which in turn connects to lamp 30. Thus, whenever the on/off switch 50 is operated and the pushbutton 84 is in the outer position, the lamp 30 will flash. Contact 104 is mounted on shaft 85 for movement therewith so that whenever button 84 is depressed, the path between battery 46 and light 30 is broken by the movement of contact 104. Likewise, electrical contacts 106 and 108 associated with pushbutton 86 connect line 78 to line 109 whenever that pushbutton is in the outer undepressed position to cause light 32 to flash. Contact 106 is mounted on shaft 87 for movement therewith so that whenever button 86 is depressed, the path connecting battery 46 to lamp 32 is broken by the movement of contact 108. The pushbutton 88 does not connect together anything, but when it is depressed the other pushbuttons automatically return to the outer position, so that depressing button 88 causes both lamps 30 and 32 to be connected to the battery 46 and accordingly both to flash to indicate that the motorist needs assistance.

The pushbuttons 110, 112, and 114 for the rear lamps operate similarly to cause the rear lamps to flash in any of the three above-described modes. Although for purposes of illustration, buttons 110, 112, and 114 are shown removed from cabinet 44 in FIG. 2, these buttons will normally be mounted below buttons 84, 86, and 88 as shown in FIG. 3. Further, as can be seen in FIG. 2, lines 116 and 118 are connected to lines 78 and 80, respectively, and in turn connect to rear lights 36 and 38 via contacts 120, 122, 124, and 126. These contacts operate in the same fashion as contacts 102, 104, 106, and 108 and contacts 122 and 124 are mounted on shafts 128 and 130, which in turn are associated with buttons 110 and 112, for movement therewith. By connecting the lines as shown, only two flashers are required to operate both the front and rear lights and yet the front and rear lights can be operated independently and in different modes simultaneously.

Many changes and modifications of the unique arrangement shown in FIGS. 1, 2, and 3 can be made without departing from the spirit of the invention. Accordingly, the scope of the invention is intended to be limited only by the scope of the appended claims.

What is claimed is:

1. A visual distress warning system for a vehicle comprising:
   a first set of signaling lamps comprising at least a first lamp producing light of a first color which is visible from the front of said vehicle and a second lamp producing light of a second color which is visible from the front of said vehicle,
   a second set of signaling lights comprising at least a first lamp producing light of said first color which is visible from the rear of said vehicle and a second lamp producing light of said second color which is visible from the rear of said vehicle, and
   manually operable control means within said vehicle for causing said first set of lamps to produce at least first, second, and third light signals, said first signal comprising the flashing of one of said lamps of a set, said second signal comprising the flashing of the other lamp of that set and said third signal comprising the flashing of both lamps of that set alternately, and for causing said second set of lights to produce at least said first, second, and third light signals, said control means including means for causing said first set of lamps to produce one signal and said second set of lamps to produce a different signal simultaneously.

2. A system as in claim 1, wherein said first color is green and said second color is blue.

3. A system as in claim 1 wherein said control means includes a first flasher means for producing a pulsing voltage output, second flasher means for producing a pulsing voltage output, means electrically connecting said first and second flasher means to a source of electrical potential, first switch means for electrically connecting said first flasher means to said first lamp in said first set of lamps to cause said first lamp in said first set to flash and said second flasher means to said second lamp in said first set of lamps to cause said second lamp in said first set to flash and second switch means for electrically connecting said first flasher means to said first lamp in said second set of lamps to cause said first lamp in said second set to flash and said second flasher means to said second lamp in said second set of lamps to cause said second lamp in said second set to flash.

4. A system as in claim 3 wherein said source of potential is a direct current battery.

5. A system as in claim 3 wherein said first and second switch means each include, first, second, and third manually depressable pushbuttons, means for maintaining a manually depressed pushbutton in a depressed position and for releasing all other depressed pushbuttons when one pushbutton is depressed, first contact means movable with said first pushbutton for connecting said first flasher means to said first lamp when said first pushbutton is not depressed and for disconnecting said first flasher means from said first lamp when said first pushbutton is depressed, and second contact means movable with said second pushbutton for connecting said second flasher means to said second lamp when said second pushbutton is not depressed and for disconnecting said second flasher means from said second lamp when said second pushbutton is depressed.

* * * * *